Sept. 26, 1933.   W. J. ANDRES   1,928,043

BRAKE SHOE

Filed Dec. 21, 1931

INVENTOR.
WILLIAM J. ANDRES
BY
ATTORNEYS.

Patented Sept. 26, 1933

1,928,043

UNITED STATES PATENT OFFICE 1,928,043

BRAKE SHOE

William J. Andres, South Bend, Ind., assignor to Bendix Aviation Corporation, South Bend, Ind., a corporation of Delaware Application December 21, 1931
Serial No. 582,434

3 Claims. (Cl. 188—250)

This invention relates to brakes and more particularly to brake shoes.

The invention comprehends an inexpensive brake shoe made from two stampings arranged back to back to provide a rim and a web supporting the rim. The stampings are shaped to provide when assembled a shoe having a slot at one end and a large shoulder at the other end. Because of the particular structure great strength and rigidity is given to the web of the shoe and in addition thereto a very desirable bearing is provided for the pivoted or articulated end of the shoe, as well as an increased shoulder or bearing surface for the force applying end of the shoe.

An object of the invention is to provide a brake shoe including two stampings so shaped that when assembled they provide a brake shoe having a slot at one end and an enlarged shoulder at the other end.

Another object of the invention is to provide a brake shoe of extremely simple structure having the minimum number of parts arranged to give the maximum strength and rigidity to the shoe.

A feature of the invention is a brake shoe including two stampings arranged back to back. The stampings have offset portions arranged to increase the bearing surface at the shouldered end of the shoe.

Another feature of the invention is to provide a shoe including two stampings arranged back to back. The stampings have offset portions arranged to provide a slot at one end of the shoe for the reception of an adjusting member.

Other objects and features of the invention will appear from the following description taken in connection with the drawing forming a part of this specification, and in which.

Figure 1:
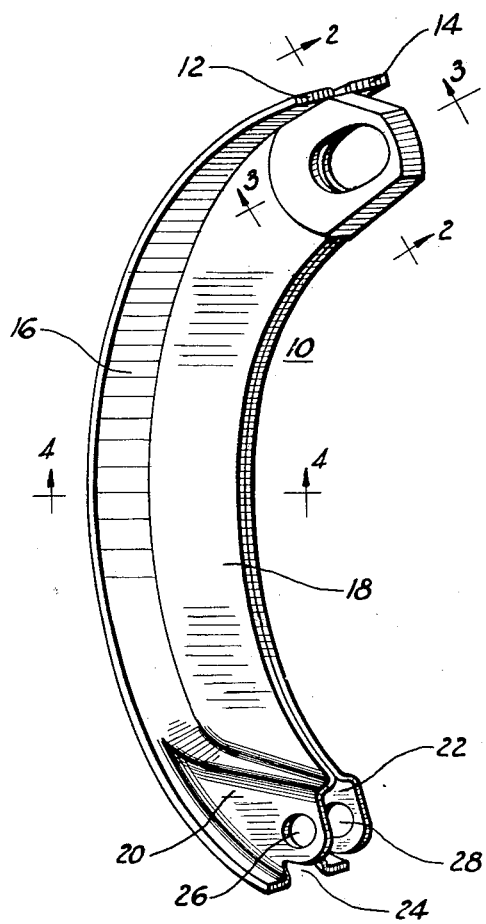
Figure 1 is a perspective view of a brake shoe embodying the invention.
Figure 2:
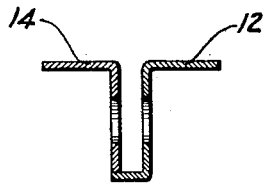
Figure 2 is a sectional view substantially on the line 2—2, Figure 1.
Figure 3:
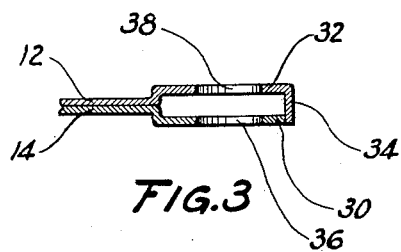
Figure 3 is a vertical sectional view on the line 3—3, Figure 1.
Figure 4:
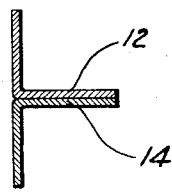
Figure 4 is a sectional view substantially on the line 4—4, Figure 1.

Referring to the drawing for more specific details of the invention, 10 represents generally a brake shoe including two stampings 12 and 14. The stampings are angular in cross section, and are curved to conform to a circular drum. The stampings are assembled back to back to provide a rim 16 and a reinforced web 18 supporting the rim.

One end of each stamping has an offset portion, indicated at 20 and 22, so that when the stampings are assembled there is provided a slot 24. The offset portions have registering transverse bores 26 and 28 for the reception of a pivot pin, not shown. Because of the offset portions, there is provided a more substantial and highly desirable bearing for the pivot pin.

The other ends of the stampings have offset portions 30 and 32 one of which has a flange 34 arranged to abut the offset portion 30 upon assembling the stampings, to provide a substantial shoulder. As shown, the offset portions 30 and 32 have registering bores 36 and 38 for the reception of an anchor, not shown. The flange 34 serves as a thrust or cam plate adapted to be engaged by a cam or other brake-applying device.

The crux of this invention is in the particular shaping of the stampings and the assembling thereof to provide a brake shoe having a slot in one end and an enlarged shoulder on the other end. These features are highly desirable because of the increased bearing surfaces.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent, is:—

1. A brake shoe comprising two stampings arranged back to back, each stamping being offset at one end to provide a shoulder and one stamping having an end portion projected across the end of the other stamping to provide a thrust surface.

2. A brake shoe comprising two stampings arranged back to back having offset portions at one end, one of which abuts against and supports the other, whereby said other is arranged to provide a shoulder.

3. A brake shoe comprising two stampings arranged back to back, an offset portion on one end of the stampings, an offset portion on one end of the other stamping, and a flange on one of the offset portions abutting the other offset portion.

WILLIAM J. ANDRES.